US009195876B2

(12) United States Patent
Tabb

(10) Patent No.: US 9,195,876 B2
(45) Date of Patent: Nov. 24, 2015

(54) OIL TANK FARM STORAGE MONITORING

(71) Applicant: DigitalGlobe, Inc., Longmont, CO (US)

(72) Inventor: Mark Tabb, Estes Park, CO (US)

(73) Assignee: DIGITALGLOBE INC., Longont, CA (US)

( * ) Notice: Subject to any disclaimer, the term of this patent is extended or adjusted under 35 U.S.C. 154(b) by 0 days.

(21) Appl. No.: 14/095,608

(22) Filed: Dec. 3, 2013

(65) Prior Publication Data
US 2014/0363084 A1 Dec. 11, 2014

Related U.S. Application Data

(63) Continuation of application No. 13/911,016, filed on Jun. 5, 2013, now abandoned.

(51) Int. Cl.
*G06K 9/46* (2006.01)
*G06K 9/00* (2006.01)
*G06T 7/60* (2006.01)

(52) U.S. Cl.
CPC . *G06K 9/00* (2013.01); *G06T 7/602* (2013.01); *G06T 2207/10032* (2013.01); *G06T 2207/30181* (2013.01)

(58) Field of Classification Search
CPC .. A61B 5/1076; A61B 5/1127; G01C 15/002; G06F 17/30274; G06F 17/30247; G06K 9/32; G06T 15/00; G06T 15/08; G06T 17/00; G06T 7/60
USPC ............. 382/190, 128, 173, 181, 199; 705/28
See application file for complete search history.

(56) References Cited

U.S. PATENT DOCUMENTS 8,473,227 B2 * 6/2013 Olson et al. ............... 702/55
2014/0149265 A1 * 5/2014 Kundra .................. 705/28

* cited by examiner

*Primary Examiner* — Mike Rahmjoo
(74) *Attorney, Agent, or Firm* — Galvin Patent Law LLC; Brian R. Galvin

(57) ABSTRACT

A system for oil storage tank monitoring, comprising an extraction module and an analysis module, wherein an extraction module is utilized to determine information from an oil storage tank image and an analysis module is utilized to perform operations on extracted information, such as for determining measurements or values of oil storage tanks.

6 Claims, 9 Drawing Sheets

OIL TANK FARM STORAGE MONITORING

CROSS-REFERENCE TO RELATED APPLICATIONS

This application is a continuation of U.S. patent application Ser. No. 13/911,016, titled "OIL TANK FARM STORAGE MONITORING", filed on Jun. 5, 2013, the entire specification of which is incorporated hereby by reference.

BACKGROUND OF THE INVENTION

1. Field of the Invention

The invention relates to the field of digital image processing, and more particularly to the field of analysis of remote sensing satellite and/or aerial image data.

2. Discussion of the State of Prior Art

In many cases, the volume of a bulk fluid (such as oil) stored in large storage facilities may need to be known or estimated by persons or entities other than those responsible for the facilities in question. For instance, it would be very valuable for traders or market analysts to know, on a time-sensitive basis, whether oil has been added or withdrawn from large storage facilities such as the national strategic petroleum reserve. Obtaining such information is typically not possible on an ad hoc basis, either because the information is proprietary (private storage facilities, or production facilities with associated storage), or because it is released publicly on a fixed schedule (which is the case for the national strategic petroleum reserve). Satellite imaging and other remote sensing capabilities make it possible to remotely observe such facilities independently of the facilities themselves (or of their owners and operators).

What is needed is a means for remotely observing bulk storage facilities such as oil storage facilities and estimating the amount of bulk commodities stored therein without the involvement of the operators or owners of those facilities.

SUMMARY OF THE INVENTION

Accordingly, the inventor has conceived and reduced to practice, in a preferred embodiment of the invention, various systems and methods for analysis of remote sensed images of oil storage tank farms or other bulk storage facilities.

Oil tank storage farms can store large volumes of oil. The tanks used often have lids floating upon the oil contained therein. For this type of storage tank the height of the lid can be used to determine the amount of oil stored therein. This disclosure describes a system for automated or semi-automated estimation of the amount of oil stored in a large number of such tanks. Due to their typically cylindrical shape, knowledge of a tank's radius and height is sufficient to estimate its storage capacity, and the height of the floating tank lid gives the amount of stored oil. Of course, other shapes such as rectangular tanks may be used in such facilities (for example, for liquid storage pools), and similar simple geometric determination of volume of fluid stored may be made based on remote observations of storage unit dimensions and fluid level. The claimed invention creates a novel special-purpose analysis system adapted to automatically or semi-automatically analyze digital images of storage tanks and estimate the volume of oil in a storage tank farm. According to a preferred embodiment of the invention, a system for digital image analysis of images of storage tanks is disclosed. According to an embodiment, the system can be implemented on, but not limited to, a stand-alone high-end image analysis workstation, or a cloud-based workstation with a web browser to interact with the various functions. Either implementation would support a manual method where elements in an image are tagged for analysis, an automatic batch-oriented method, or an interactive semi-automatic method that refines an automated technique via machine learning.

According to an embodiment, the analysis system comprises a data input function, an image display function, a software cursor generator function controlled by means of a trackball (or digital mouse or other pointing device), whose coordinates in the displayed image can be read into a processing function, a tank outline processing function, a lid processing function, a shadow processing function, a shadow mask generating function, a volume estimation function, and an executive function to manage the process.

According to a preferred embodiment of the invention, a time series of images is assumed covering storage tanks of interest, with irregular temporal sampling intervals and a large range of data acquisition parameters (i.e., look angles) and solar illumination geometry being fully supported. An embodiment of the invention assumes that initial estimates are available for each tank location, radius, and height. According to an embodiment of the invention, given image acquisition parameters, sun position, and the physical parameters for a tank (radius, height, 3D location), the shape of the sun shadow projected onto the tank lid can be predicted as a function of the tank lid height.

According to a preferred embodiment of the invention, a process was created to determine the tank fill fraction 451, which yields the closest agreement between the predicted shadow shape and that observed in the imagery. An advantage of this approach is that it works over a wide range of viewing geometric elevation parameters, including nadir look angles. Acceptable sun elevation angles are from around 30° to 70°, which also represents a wide range.

According to a preferred embodiment of the invention, a unique special purpose analysis system was created to automatically or semi-automatically analyze digital images of storage tanks and estimate the volume of fluid in a the tank storage farm over a period of time. For illustrative purposes the fluid assumed is oil, but could be any of a number of liquid materials in storage systems with "floating lids".

In a further embodiment of the invention, an analysis and extraction module may be operated within a single computing device such as (for example) a desktop or server workstation, as are common in the art. Such an arrangement may be useful for operating dedicated systems for oil tank monitoring, and may further comprise additional hardware or software components such as (for example) video display devices, input devices such as a keyboard or mouse (or other text, pointer, or similar input device), storage devices such as for storing oil tank images (such as internal, external or removable media that may be of magnetic, optic, or other physical construction or operation), or additional software such as for additional analysis operations (as might be provided by third-party vendors for performing specialized functions, for example). It should be appreciated that the specific nature of such devices may vary according to the invention, and additional or alternate elements may be utilized.

BRIEF DESCRIPTIONS OF THE DRAWING FIGURES

The accompanying drawings illustrate several embodiments of the invention, and together with the descriptions, serve to explain the principles of the invention according to embodiments. One skilled in the art will recognize that the particular embodiments illustrated in the drawings are merely exemplary, and are not intended to limit the scope of the present invention.

DETAILED DESCRIPTION

Figure 1:
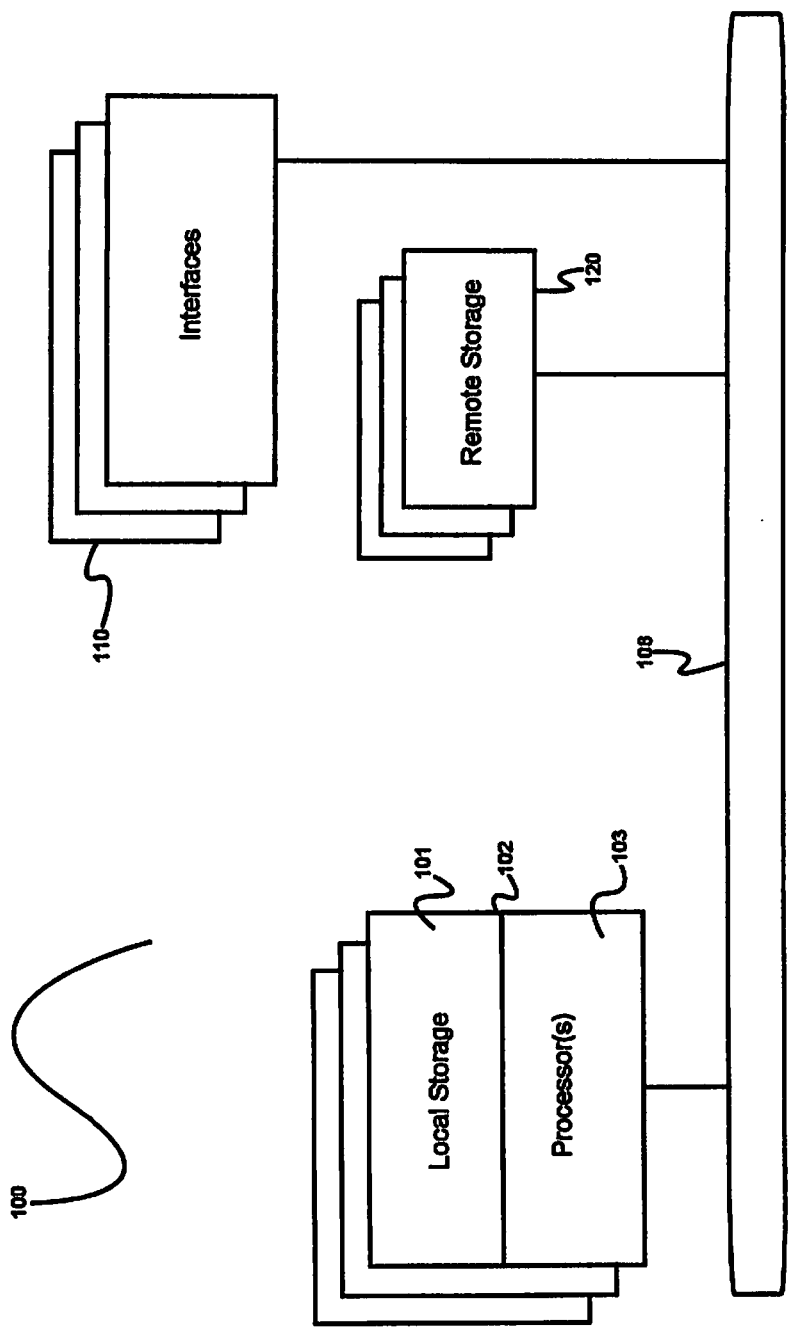
FIG. 1 is a block diagram illustrating an exemplary hardware architecture of a computing device.

The inventor has conceived, and reduced to practice, various systems and methods for automated or semi-automated estimation of the amount of liquid stored in a large number of tanks by analysis of remote imagery of the tanks.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, analysis steps or the like may be described in a sequential order, such processes, methods and analysis steps may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or analysis is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

DEFINITIONS

As used herein, "remote sensing" means a method of determining physical parameters through the analysis of digital image data created by an instrument observing a remote scene, such as from a satellite in orbit above the earth. The instrument may be a digital framing camera with a 2-D imaging sensor, or a "push-broom" type of system with a linear array sensor.

Hardware Architecture

Figure 2:
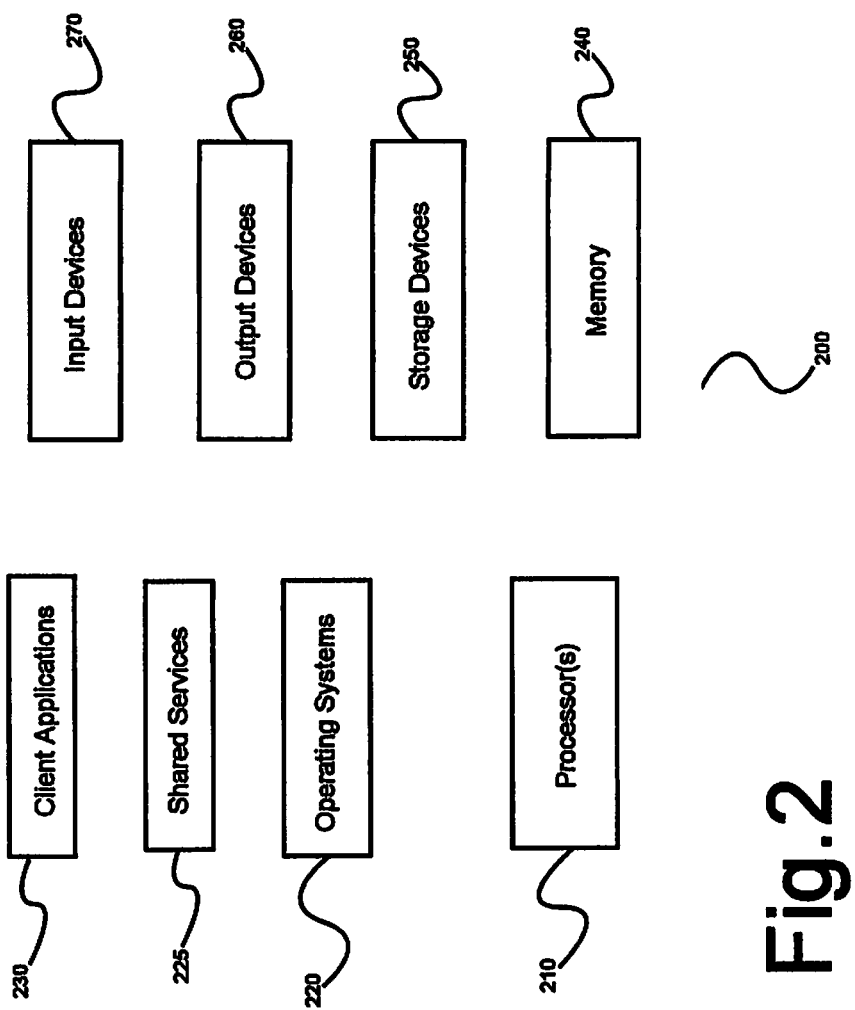
FIG. 2 is a block diagram illustrating an exemplary logical architecture for a client device, according to an embodiment of the invention.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card. Referring to FIG. 2, in order to allow interaction with the digital image data, a visual display system (e.g. output device 260), a means of generating a digital "cursor" that can be moved through the image and it's position read out, and a hand operated tracking/pointing device (e.g. input device 270 may be of any type suitable for receiving user input), including for example a keyboard, touchscreen, microphone (for example, for voice input), mouse, touchpad, trackball, or any combination thereof that can control the cursor's position, or via some other hardware-only approach known in the art.

Software/hardware hybrid implementations of at least some of an embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like). Moreover, in some embodiments one or more aspects, or all aspects, of the invention may optionally be implemented via a specially programmed chip (for instance, an application specific integrated circuit, or ASIC, or an erasable programmable read only memory, or EPROM), or via some other hardware-only approach known in the art.

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network, a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate application software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 1 illustrates one specific architecture for a computing device 100 for implementing one or more embodiments of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of an embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
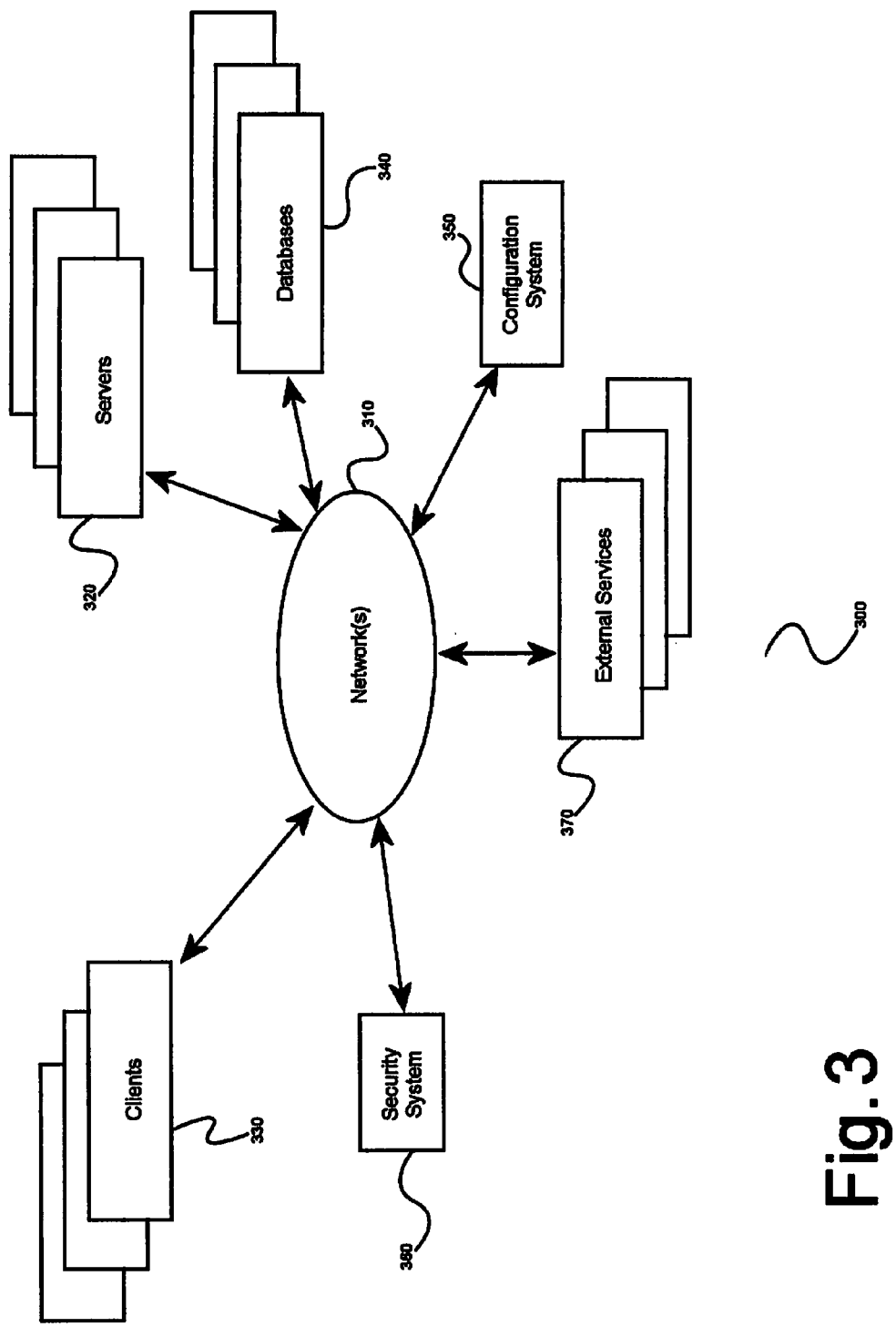
FIG. 3 is a block diagram illustrating an exemplary architectural arrangement of clients, according to an embodiment of the invention.

In some embodiments, systems of the present invention may be implemented on a distributed computing network, such as one having any number of clients and/or servers. Referring now to FIG. 3, there is shown a block diagram depicting an exemplary architecture for implementing at least a portion of a system according to an embodiment of the invention on a distributed computing network. According to an embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax™, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop, MapReduce, Big- Table, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration 350 system or approach is specifically required by the description of any specific embodiment.

In various embodiments, functionality for implementing systems or methods of the present invention may be distributed among any number of client and/or server components. For example, various software modules may be implemented for performing various functions in connection with the present invention, and such modules can be variously implemented to run on server and/or client components.

Figure 4:
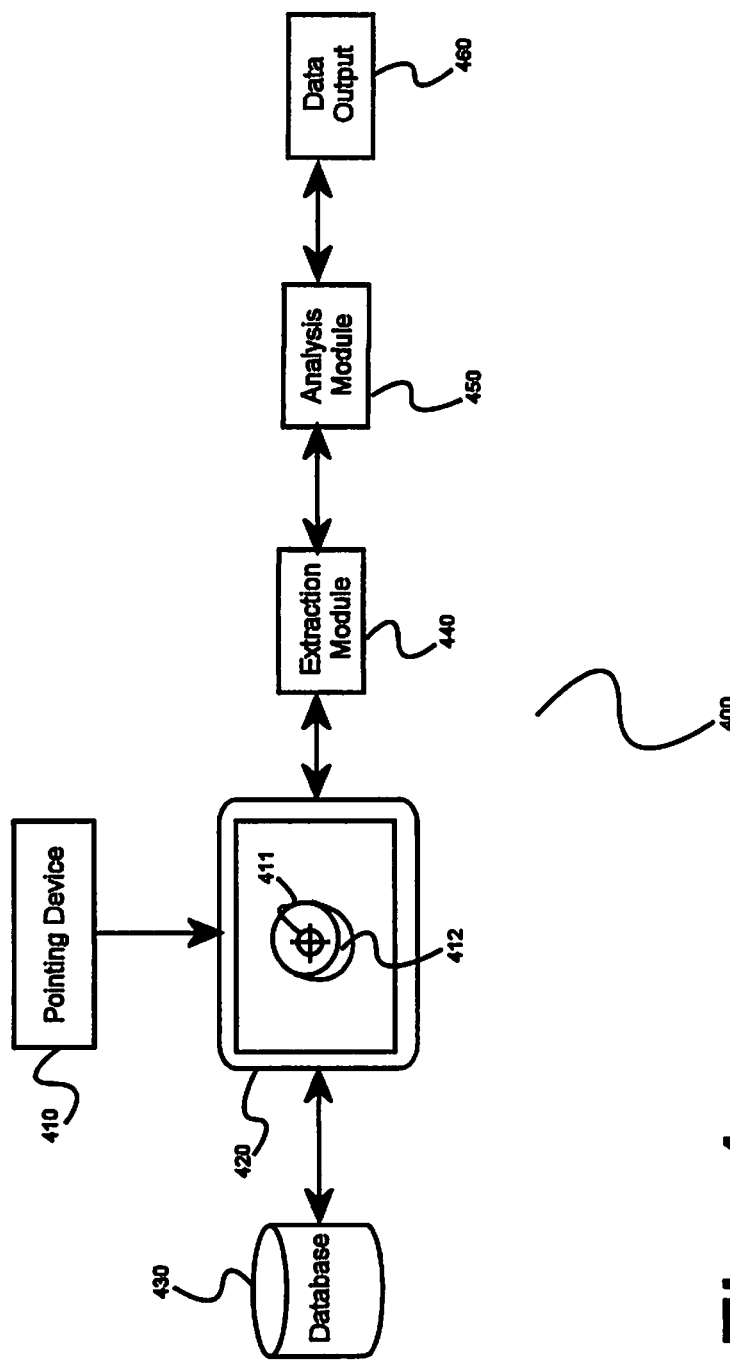
FIG. 4 is a block diagram providing a conceptual overview of a preferred embodiment of the invention, by which tank storage capacity may be estimated.

According to an embodiment of the invention, FIG. 4 is a block diagram providing a conceptual overview of a system 400 for determining features or characteristics of storage tanks. As illustrated, various components of system 400 may be interconnected via a variety of means for communication, such as via a direct physical connection (such as via electronic cables or wired connections), or via a remote or cloud-based communication connection interchangeably. In such a manner, it will be appreciated that system 400 may be readily adaptable to a variety of configurations comprising varying arrangements of distributed or local components and arrangements, as described later (referring to FIG. 5 and FIG. 6).

According to an embodiment, a pointing device 410 may be used to position a cursor 411 to make an interactive selection of a storage tank 412 displayed on a display device 420, which might be a computer monitor, electronic device with integral display such as a tablet or laptop computing device, or any similar video display device. Using such a display 420 with appropriate software components for interaction (as described below, referring to FIG. 5) it may be possible to determine initial location coordinates for a tank 412. Then cursor 411 may be used to interactively determine initial values for a tank, such as (for example) height measured from the base to the rim, tank radius, or inside distance from a tank rim to a floating top. Alternatively, tank dimensions may be loaded from an existing database 430 of known storage facility dimensions, which may either be acquired from storage facility operators or determined directly by a user of the invention and stored for future use. Furthermore, while most examples herein are made with reference to cylindrical tanks, it will be apparent to one having ordinary skill in the art that other geometries (such as rectangular) that have known volume formulas dependent on height may be used according to the invention. Also, most examples are made regarding oil storage, but it will be readily understood by one having ordinary skill in the art that oil storage is merely an exemplary use of the invention, and many other uses of the invention are envisioned by the inventor. For example, water level in drydocks, volume of material removed from quarries or strip mines, or levels of fluid stored in chemical tanks may be determined using remotely-obtained dimensional measurements, according to various embodiments of the invention.

According to an embodiment, extraction module 440 may extract image acquisition parameters and sun position from an image data header. Analysis module 450 may use those parameters together with the initial physical parameters for a tank (radius, height, or 3-D location) determined by application of an interactive cursor to determine the relative image rotation angle for a given tank image (or, as mentioned above, loaded directly from an existing database of tank dimensions). This information may be used in analysis module 450 to predict the shape of the sun shadow projected onto the tank lid as a function of the tank lid height. A further analysis module 450 may then be used to determine lid height (or equivalently, tank fill fraction), which yields the closest agreement between the predicted shadow shape and that observed in the imagery.

According to an embodiment of the invention, digital image data processed may typically be of storage tanks, such as oil tanks in tank farms herein, although other forms of volumetric measurement may be performed according to the invention. Due to storage tanks' typical cylindrical shape, knowledge of a tank's radius and height is usually sufficient to estimate its storage capacity; furthermore, for the cases where a tank has a "floating lid", the height of the tank lid may be used to compute a volume of stored liquid inside.

In the art, parameters may be extracted from the image data header for each digital image by extraction module 440, providing, for example, a time of observation, an orbital position of the satellite observing platform, and an orientation of the satellite observing platform (R=roll, P=pitch, & Y=yaw) with respect to an earth-centered coordinate system.

In the art, the ancillary data for each digital image may also provide image acquisition parameters in order that image distance measurements (in pixels) may be scaled to absolute linear measurements. Ancillary data for each digital image may also provide sun angle position data for the time corresponding to the center of the digital image, from which analysis module 450 calculates shadow direction, length, and shape for the digital images of the storage tanks.

Initial estimates may be available for each tank's location, radius, and height. These initial estimates may be manually determined from other remote sensing sources such as aerial or satellite imagery, or extracted from the digital image through some other means, such as by use of a trackball controlled cursor, or they may be loaded directly from an existing data store.

According to an embodiment of the invention, analysis module 450 incrementally refines the initial estimates for each tank to be measured, using information extracted from a time-oriented series of digital images of the storage tanks. A time-oriented series of imagery may be assumed to include tanks of interest, with irregular time sampling intervals and a large range of image acquisition parameters.

According to the embodiment illustrated, output 460 from various components of system 400 may be produced and transmitted via a connection (which may be of varied nature as described above), such as for further use or analysis or storage in a database 420 as described above. It should be appreciated that such output data may have varied content and be utilized in a variety of means according to the invention, and that the arrangement illustrated is exemplary in nature and additional or alternate components may be utilized according to the invention, such as for further utilization of output data 460.

Figure 5:
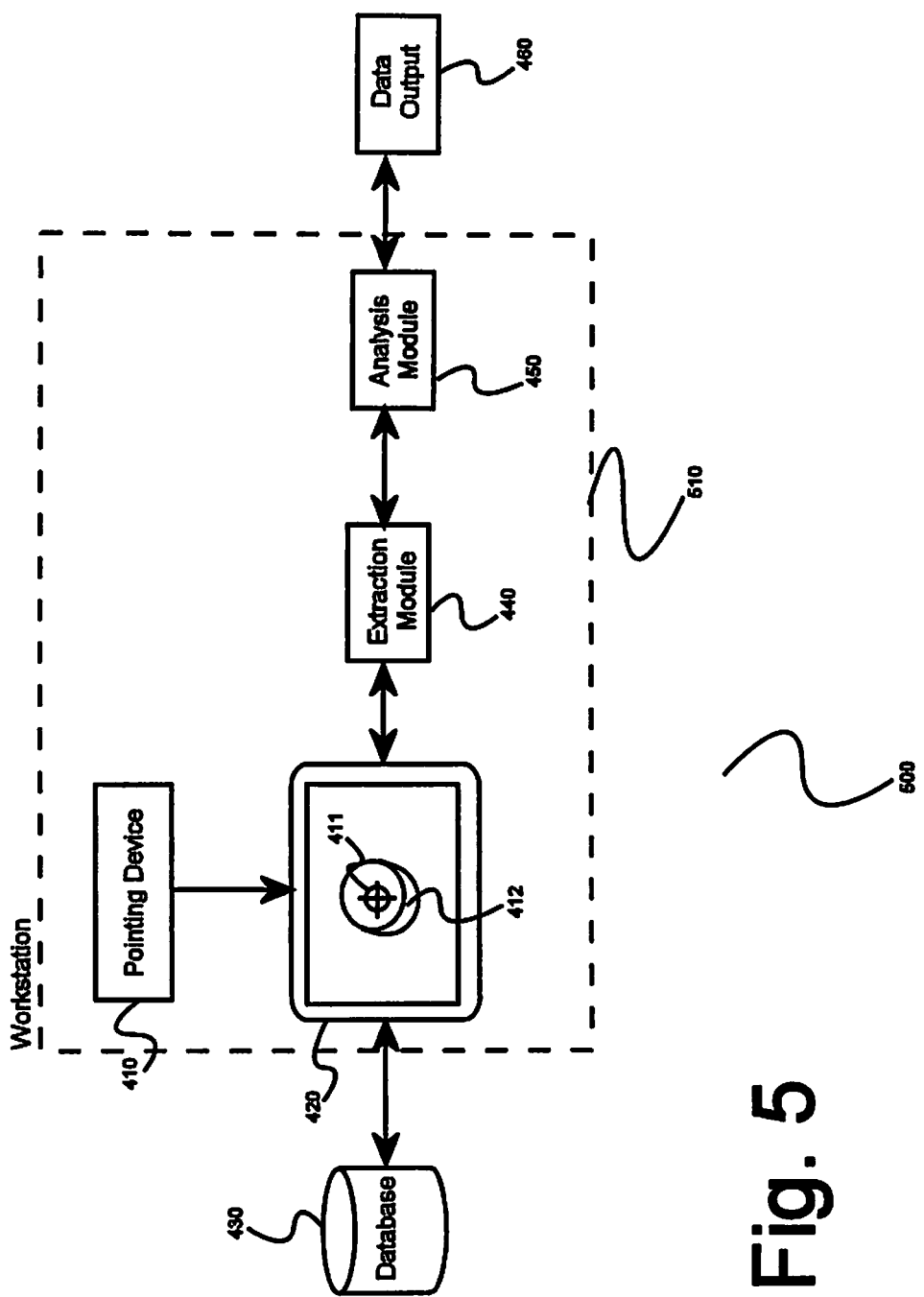
FIG. 5 is a block diagram of a specially configured workstation according to an embodiment of the invention.

According to an embodiment of the invention, FIG. 5 is a system architecture diagram of an alternate image analysis system 500 residing and operating within a high-end workstation 510 on which the storage capacity and current loading of oil storage tanks may be determined. According to an embodiment, a cursor may be used to make an interactive selection of a storage tank and determine initial location coordinates for the tank image. Then the cursor may be used to interactively determine initial values for the tank height measured from the base to the rim, the tank radius, and the inside distance from the tank rim to the floating top.

According to an embodiment, an extraction module 440 on the workstation extracts the image acquisition parameters and sun position angles from the image data header. An analysis module 450 uses those parameters together with the initial physical parameters for a tank (radius, height, and 3-D location) determined by application of an interactive cursor to determine the relative image rotation angle for a given tank image. This information may be used in a further analysis module 450 to predict the shape of the sun shadow projected onto the tank lid as a function of the tank lid height. Analysis module 450 may then be used to determine the lid height (or equivalently, the tank fill fraction), which yields the closest agreement between the predicted shadow shape and that observed in the imagery.

According to an embodiment of the invention, an analysis module 450 on the workstation incrementally refines the initial estimates for each tank to be measured, using information extracted from a time-oriented series of digital images of the storage tanks. A time-oriented series of imagery may be assumed to include tanks of interest, with irregular time sampling intervals and a large range of image acquisition parameters.

According to an embodiment of the invention, digital image data processed may typically be of storage tanks, such as oil tanks in tank farms herein, although other forms of volumetric measurement may be performed according to the invention. Due to storage tanks' typical cylindrical shape, knowledge of a tank's radius and height is usually sufficient to estimate its storage capacity; furthermore, for the cases where a tank has a "floating lid", the height of the tank lid may be used to compute a volume of stored liquid inside.

In the art, parameters may be extracted from the image data header for each digital image by analysis module 450, providing, for example, a time of observation, an orbital position of the satellite observing platform, and an orientation of the satellite observing platform (R=roll, P=pitch, & Y=yaw) with respect to an earth-centered coordinate system.

In the art, ancillary data from each digital image data header may provide image acquisition parameters so that image distance measurements (in pixels) may be scaled to absolute linear measurements. In the art, ancillary data from each digital image data header may also provide sun angle position data for the time corresponding to the center of the digital image, from which analysis module 530 calculates shadow direction, length, and shape for the digital images of the storage tanks.

In the art, initial estimates are available for each tank's location, radius, and height. These initial estimates may be manually determined from other remote sensing sources such as aerial or satellite imagery, or extracted from the digital image through some other means, such as by use of a trackball controlled cursor.

According to an embodiment of the invention, an analysis module 550 incrementally refines the initial estimates for each tank to be measured, using information extracted from a time-oriented series of digital images of the storage tanks. A time-oriented series of imagery may be assumed to include tanks of interest, with irregular time sampling intervals and a large range of image acquisition parameters.

Figure 6:
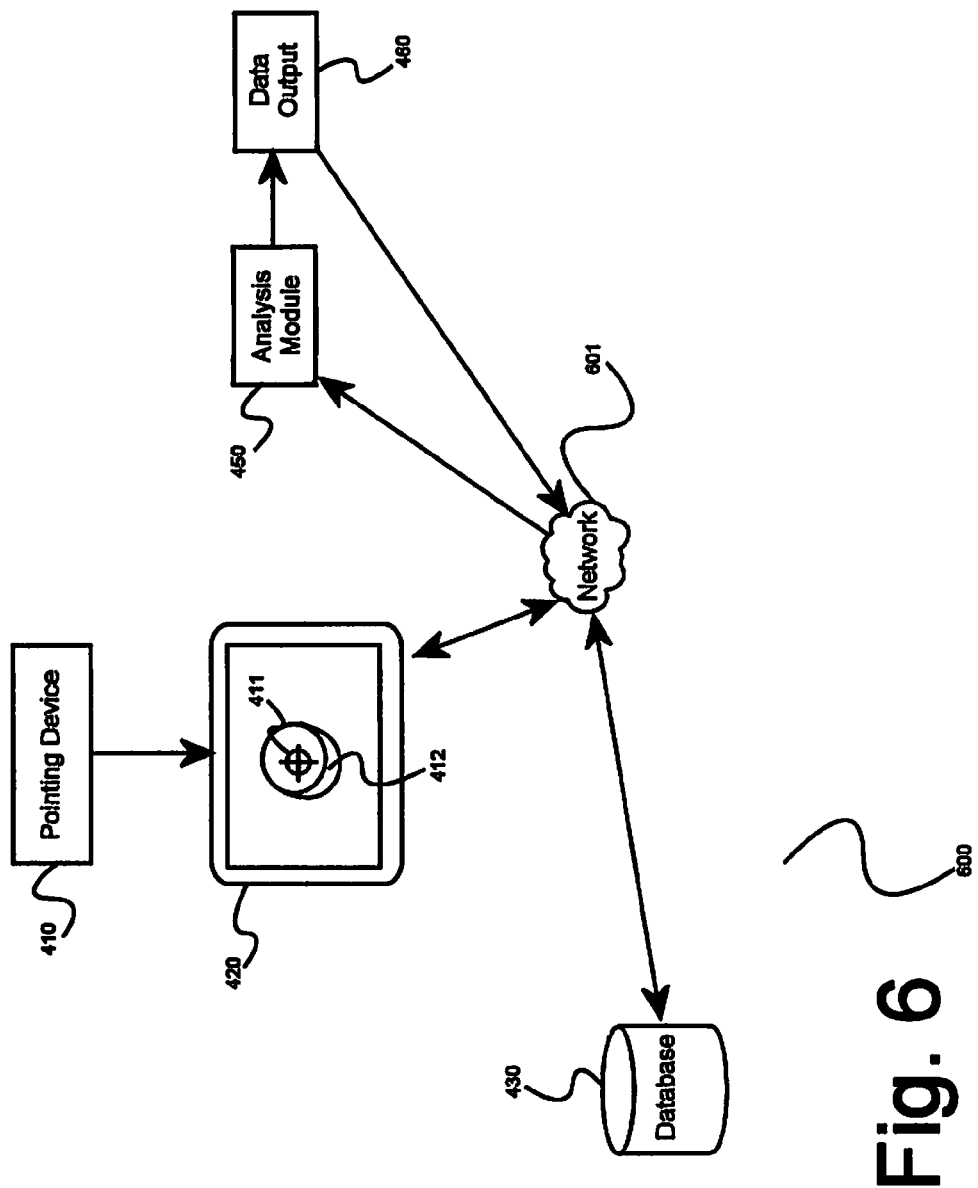
FIG. 6 is a block diagram of a system for estimating tank storage capacity using a cloud-based service, according to a preferred embodiment of the invention.

According to an embodiment of the invention, FIG. 6 is a system architecture diagram of an alternate image analysis system 600 with data and analysis modules residing in one or more cloud systems. These cloud systems may be addressable on a browser through the Internet to data and analysis modules previously loaded into one or more cloud systems. According to an embodiment, a cursor 411 may be used to make an interactive selection of a storage tank 412 and determine initial location coordinates for the tank image 412. Then the cursor may be used to interactively determine initial values for the tank height measured from the base to the rim, the tank radius, and the inside distance from the tank rim to the floating top.

According to an embodiment, extraction module 440 in the cloud extracts the image acquisition parameters and sun position angular data from the image data header. An analysis module 450 uses those parameters together with the initial physical parameters for a tank (radius, height, and 3-D location) determined by application of an interactive cursor to determine the relative image rotation angle for a given tank image. This information may be used in analysis module 450 to predict the shape of the sun shadow projected onto the tank lid as a function of the tank lid height. Analysis module 450 may then be used to determine the lid height (or other parameters such as for example the tank fill fraction), which yields the closest agreement between the predicted shadow shape and that observed in the imagery.

According to an embodiment of the invention, an analysis module 450 in the cloud incrementally refines the initial estimates for each tank to be measured, using information extracted from a time-oriented series of digital images of the storage tanks loaded into the cloud. A time-oriented series of imagery may be assumed to include tanks of interest, with irregular time sampling intervals and a large range of image acquisition parameters.

According to an embodiment of the invention, digital image data processed may typically be of storage tanks, such as oil tanks in tank farms herein, although other forms of volumetric measurement may be performed according to the invention. Due to storage tanks' typical cylindrical shape, knowledge of a tank's radius and height may usually be sufficient to estimate its storage capacity; furthermore, for the cases where a tank has a "floating lid", the height of the tank lid may be used to compute a volume of stored liquid inside.

In the art, parameters may be extracted from the image data header for each digital image by analysis module 440, providing, for example, a time of observation, an orbital position of the satellite observing platform, and an orientation of the satellite observing platform (R=roll, P=pitch, & Y=yaw) with respect to an earth-centered coordinate system.

In the art, the ancillary data for each digital image may also provide image acquisition parameters in order that image distance measurements (in pixels) may be scaled to absolute linear measurements. Ancillary data for each digital image may also provide sun angle position data for the time corresponding to the center of the digital image, from which analysis module 450 calculates shadow direction, length, and shape for the digital images of the storage tanks.

In the art, initial estimates are available for each tank's location, radius, and height. These initial estimates may be manually determined from other remote sensing sources such as aerial or satellite imagery, or extracted from the digital image through some other means, such as by use of a trackball controlled cursor.

According to an embodiment of the invention, an analysis module 450 incrementally refines the initial estimates for each tank to be measured, using information extracted from a time-oriented series of digital images of the storage tanks. A time-oriented series of imagery may be assumed to include tanks of interest, with irregular time sampling intervals and a large range of image acquisition parameters.

According to an embodiment of the invention, system 600 (or systems 400 or 500, as the basic process steps used in systems 400 and 500 are analogous to those in method 600) may be nested in a semi-automatic process. This process, as diagrammed in FIG. 7, first locates individual members of a group of storage tanks in a single image, then determines for each tank all parameters needed to measure volume and fill fraction. The semi-automated process then loads the next image in a time oriented sequence and repeats the process of locating individual tanks and applying any image corrections on a tank by tank basis to improve data correlation. The process continues with determining volume and fill fraction of each tank and then additional images in the sequence are loaded and processed.

Figure 7:
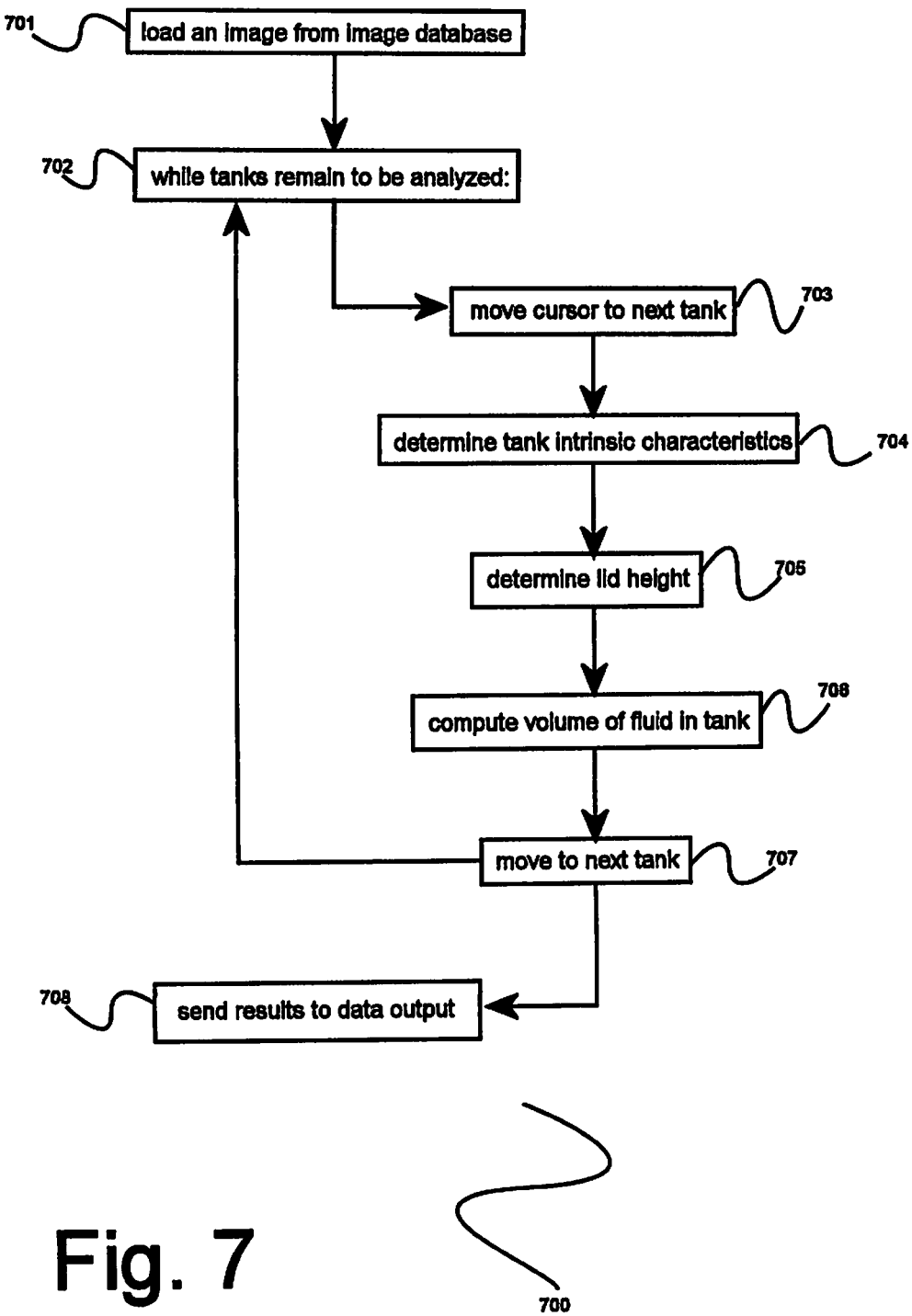
FIG. 7 is a process flow diagram of a method for estimating storage capacity of a group of storage tanks using semi-automated analysis.

FIG. 7 is a method diagram illustrating an exemplary method 700 for selecting and analyzing a tank within an image, according to an embodiment of the invention. In an initial step 701, an image may be loaded from a database or other datastore, for interaction or analysis. In a next step 702, a loop may begin to iterate over tanks in the image, starting with a first substep 703, wherein a cursor may be moved to a position indicating a next tank. In a next substep 704, a selected tank's basic or intrinsic characteristics may be determined, such as visible diameter or other immediately-available information. In a next substep 705, a tank's characteristics may be utilized to determine the height of a lid on the tank. In a next substep 706, previously computed data may be used to compute the volume of fluid within a tank, i.e. the tank's "fill level". In a final substep 707, a next tank may be selected for iterative processing, if one remains. If no tanks remain in the image area, in a final step 708 processed data may be produced as output to be viewed or further processed or stored.

Figure 8:
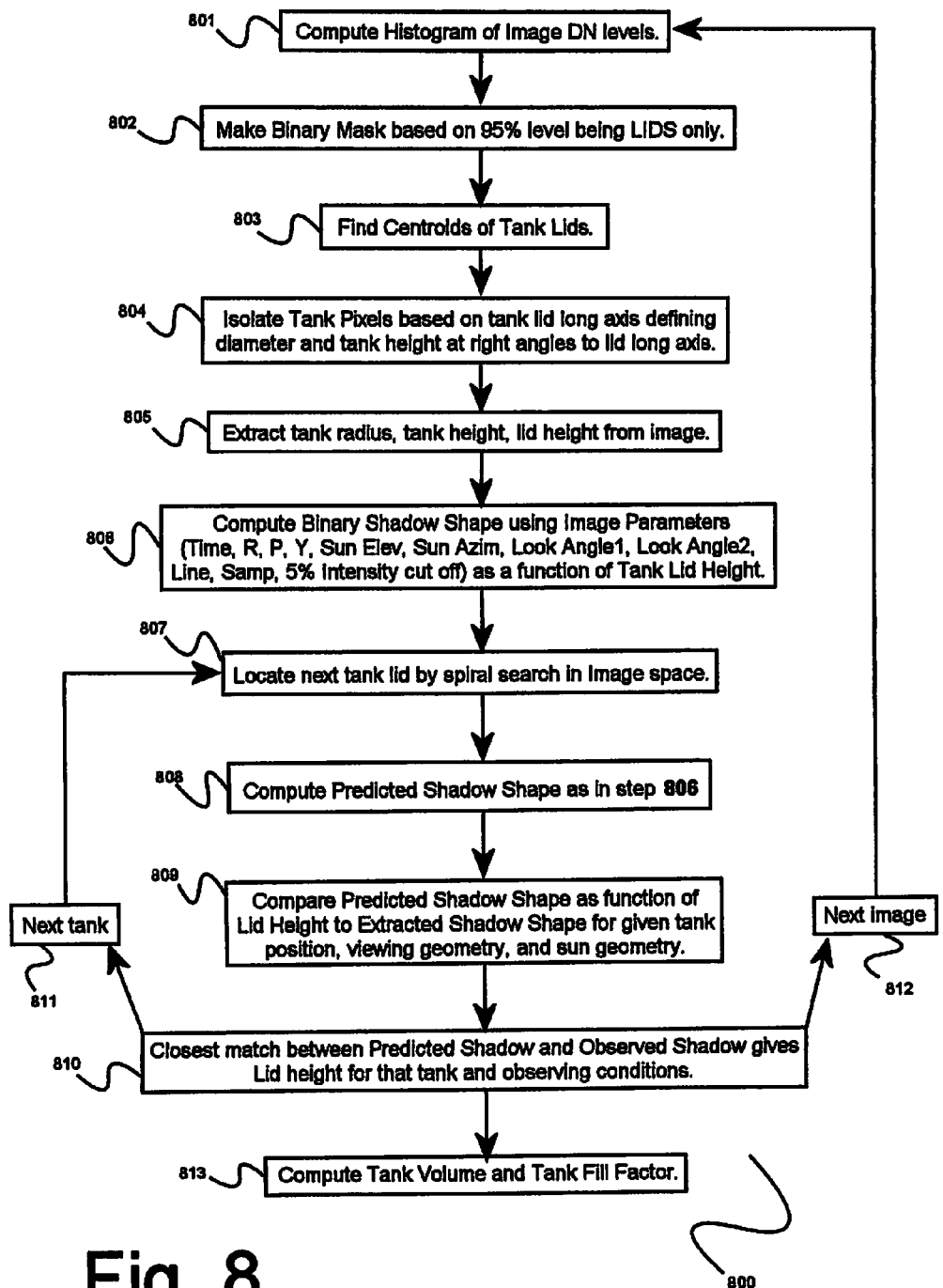
FIG. 8 is a method diagram illustrating an exemplary method for analyzing tank data to compute overall volume and current fill.

FIG. 8 is a method diagram illustrating an exemplary method 800 for analyzing tank data to compute overall volume and current fill, according to an embodiment of the invention. In an initial step 801, image data may be received and analyzed to compute tank levels or locations. In a next step 802, a binary image mask may be created, indicating image areas representing tank lids (potentially based on a 95% height level consistency, indicating a flat or otherwise lidlike surface). In a next step 803, centroids may be determined for each tank lid, to provide a representation of a tank lid's location. In a next step 804, pixels of a tank displayed within the image may be isolated based on the lid's longitudinal axis, representing the tank's diameter, as well as right angles to the axis, representing the tank's height. In a next step 805, data ascertained thus far in previous steps may be used to compute further tank values that may be inferred from known data, such as a tank's height, radius, or lid height from tank's base. In a next step 806, tank lid height as previously computed may be used to determine a tank's shadow properties for further analysis. In a next step 807, a next tank may be located such as by a spiral search algorithm in the image space, to continue processing on multiple tanks within a given image area. In a next step 808, a tank's shadow shape may be predicted as in above step 806. In a next step 809, this predicted shadow may be compared to an extracted shadow computed from known data such as tank position, viewing angle, sun position, or other relevant information regarding either a particular tank or image space being viewed. In a next step 810, a closest match from shadow comparison in a previous step 809 may be selected as a new lid height measurement for a given tank and viewing condition (such as sun position, viewing angle, or other conditions). In a looping step 811, a next tank may be selected and processing continues according to step 807 within an image space, or in an alternate looping step 812 a next image may be selected and processing continues from an initial step 801 within a new image space. In a final step 813, tank volume and fill factor may be computed from resulting output data from previous processing steps for processed tanks and image.

Figure 9:
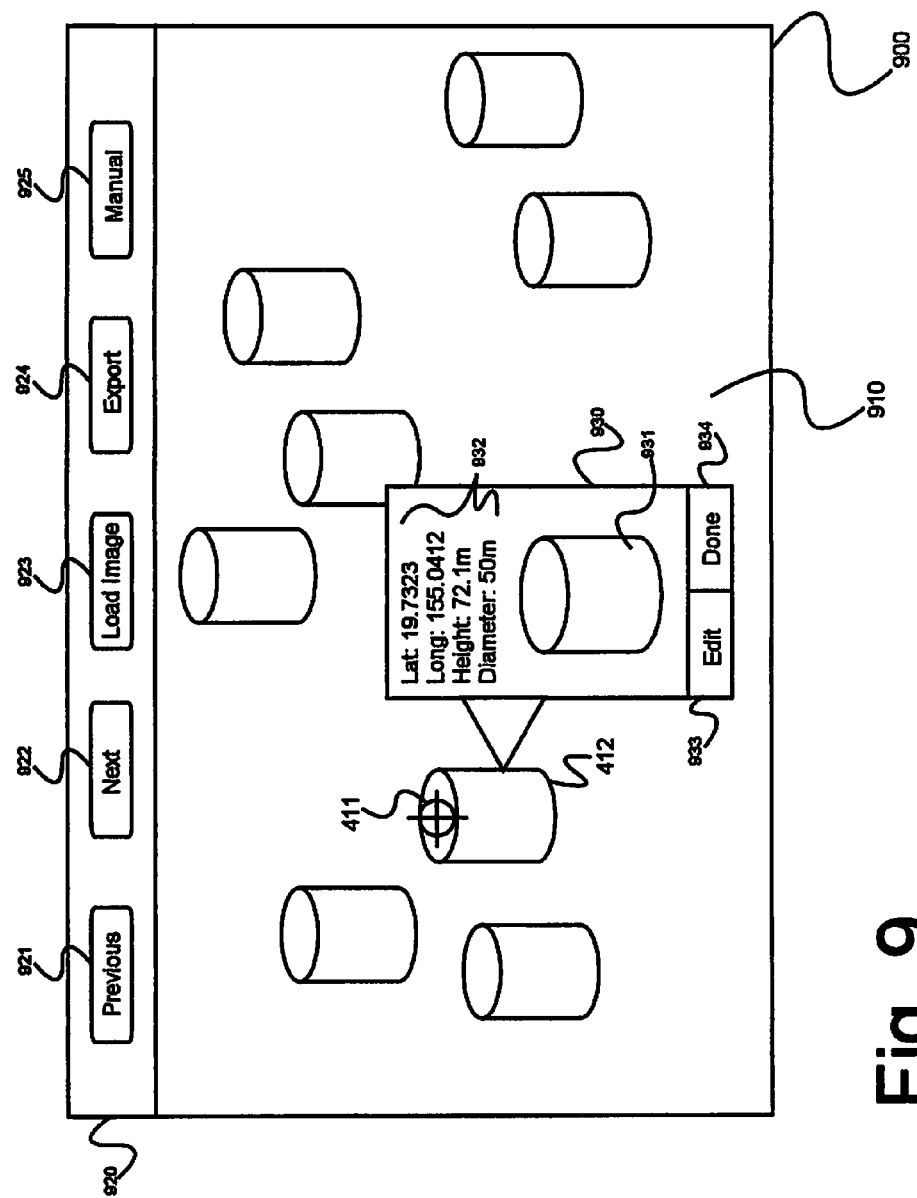
FIG. 9 is a user interface diagram of an embodiment implementing the concept of FIG. 7.

FIG. 9 is an illustration of an exemplary user interface 900, for viewing and interacting with various components or data of a system 400. As illustrated, an image 910 may be viewed for user interaction, such as positioning of a cursor 411 as described previously (referring to FIG. 4), for analysis of a tank 412 being displayed. A plurality of clickable or otherwise interactive interface component 920 such as a button may be utilized, such as for loading a new image (as illustrated) or other interaction as may be desirable. It should be appreciated that a variety of interactions may be desirable and possible according to the invention, such as utilizing interface elements for positioning of cursor 411 rather than use of a pointing device as previously described (such as in hardware arrangements without a pointing device), or other uses.

Conceptual Overview

An embodiment of the invention leads to a unique method of analysis that may produce usable results over a wide range of data acquisition "look angles", including nadir look angles, thus accommodating a very wide range of observing or viewing geometry. Also, the acceptable sun elevation angles are from around 30° to 70°, which represents a very wide range of illumination geometry. For the purposes of this embodiment, the method 400 will be discussed below. The workstation method 500 or the cloud based method 600 could as easily been chosen.

Formulation of the problem—according to an embodiment of the invention, for a given satellite or aerial image acquisition, there can be uncertainty in both the instrument position and angular orientation. For both a framing camera as well as a push broom sensor, this error is well modeled by a 3-D positional offset 421 and a 3-angle relative rotation 422. For satellite imagery assuming a near circular orbit, the positional error described by a set of three linear offsets in 421 typically may be ignored. As a result, aligning a particular satellite image to absolute coordinates may be described with a 1×3 set of three rotational parameters 422.

According to an embodiment of the invention, for each tank, estimates of the radius, height, and 3-D location need to be updated. These parameters are assumed to be unchanging over time, but as more information (i.e. contained in a time oriented series of digital images) becomes available, these parameters may be re-estimated by method 440 improving their accuracy. Finally, the fill fraction of each tank may be estimated from each digital image. These estimates are considered uncorrelated over time, and the fill fraction may be constrained only to lie on the unit interval.

Relative rotation estimation—according to an embodiment of the invention, estimating the three relative rotation parameters 422 can be accomplished using any number of modern computer vision and or photogrammetry techniques. In the art, one such embodiment may be to determine image tiepoints (correspondences) in a time oriented series of digital images, and then perform a "bundle adjustment", to align the images with respect to one another. Such a relative alignment also yields increased alignment with a global coordinate system, as the pointing errors for multiple images may have large uncorrelated components across different orbits. In the art, tiepoint approaches such as those using interest points and descriptors (SURF, SIFT, etc.) may be used, as well as normalized cross correlation of image patches.

Tank top estimation—an embodiment of the invention attempts to achieve pixel level registration of the oil tanks over time. Errors in the current estimates for the image 1×3 set of relative rotation angles, as well as the tank intrinsic characteristics data (413, 412, & 411), can contribute to residual registration error. As a result, an analysis method 440 is utilized to solve for the 2-D displacement 441 in image space of the top of the tank from its actual location in the imagery versus its predicted location.

According to an embodiment of the invention, with data from only a single image, updating tank intrinsic characteristics data would be under determined, but with the acquisition of additional images over time, the estimation will be well conditioned. As a result, the tank intrinsic characteristics data can be updated with each new image acquisition using standard least squares or Kalman filter techniques. Appropriate covariances are utilized on the measurements, including the believed accuracy with which the initial tank intrinsic characteristics data were estimated.

According to an embodiment of the invention, the 2-D displacement estimation 441, may be computed initially with an approach that will be invariant to the unknown fill fraction of the tank 451, and then in a subsequent step, the displacement may be estimated jointly with the fill fraction. Both approaches utilize the idea that the top of the tank typically may be quite bright in the image whereas the shadowed area may be significantly darker.

In the first approach, the portion of the tank top that may be visible, independent of the tank fill fraction, may be determined. This may be accomplished by assuming a completely empty tank, i.e. that the distance from the lid to the tank rim may be the same as the tank height. Then using standard photogrammetric equations, a prediction can be made to indicate which portion of the tank lid may be both visible and not shadowed. A strong image edge (intensity gradient) should exist along the portion of this region that coincides with the outer rim of the tank. A simple template may be calculated that corresponds to this edge. The template may be given a value of 1 where the tank top may be visible, −1 for the image pixels lying within a specified annulus of the outer edge segment, and zero elsewhere. The maximum response to this template over a 2-D displacement window is determined, and this displacement is used in the subsequent refinement step.

According to an embodiment of the invention, in the second refinement step, the tank fill fraction 451 may be estimated jointly with a refinement of the 2-D displacement 441. The refinement window typically may be made smaller than that used in the prior step. In this step, the distribution of image intensities (in the art, such a distribution of intensity levels may be commonly referred to as a histogram) within the visible tank interior may be assumed to belong to one of two clusters: "shadowed" or "unshadowed". The interior sides of a tank may be quite dark radiometrically, and assumed to belong to the "shadowed" cluster. In the art, cluster centers may be estimated using a simple two-class k-means approach. Cluster initialization may be important, as few (if any) "shadowed" pixels may be present if the tank were nearly full. For this initialization, the "unshadowed" cluster center may be given by the image intensity level corresponding to the $95^{th}$ percentile of the distribution of image intensity levels within the overall image, and the "shadowed" cluster center may be given by the image intensity level corresponding to the $5^{th}$ percentile of the distribution of image intensity levels within the overall image. In the art, these cluster center levels form the maximum and minimum levels used to linearly rescale the pixels in the visible tank interior to the range [0, 1].

Then, for a given 2-D displacement 441 and tank fill fraction 451, a predicted image (in the art, often referred to as a "binary mask") may be generated. This prediction may be compared to the measured image intensity values using a sum of absolute difference metric, although in the art, other standard difference metrics could be used as well. The values yielding the best agreement over the range of 2-D displacement 441 and tank fill fraction 451 may be determined.

In this embodiment of the invention, the result of this optimization method may be estimates of the fill fraction 451 of each tank, as well as updates to the tank intrinsic parameters. For this embodiment of the invention, these estimates may be obtained without any requirement for absolute radiometric de-calibration of data from the remote sensing instrument detector array.

Generally this embodiment of the invention requires only that the image data be from a panchromatic channel of a remote sensing source.

FIG. 7 is a method diagram illustrating an exemplary method 700 for selecting and analyzing a tank within an image, according to an embodiment of the invention. In an initial step 701, an image may be loaded from a database or other datastore, for interaction or analysis. In a next step 702, a loop may begin to iterate over tanks in the image, starting with a first substep 703, wherein a cursor may be moved to a position indicating a next tank. In a next substep 704, a selected tank's basic or intrinsic characteristics may be determined, such as visible diameter or other immediately-available information. In a next substep 705, a tank's characteristics may be utilized to determine the height of a lid on the tank. In a next substep 706, previously computed data may be used to compute the volume of fluid within a tank, i.e. the tank's "fill level". In a final substep 707, a next tank may be selected for iterative processing, if one remains. If no tanks remain in the image area, in a final step 708 processed data may be produced as output to be viewed or further processed or stored.

FIG. 8 is a method diagram illustrating an exemplary method 800 for analyzing tank data to compute overall volume and current fill, according to an embodiment of the invention. In an initial step 801, image data may be received and analyzed to compute tank levels or locations. In a next step 802, a binary image mask may be created, indicating image areas representing tank lids (potentially based on a 95% height level consistency, indicating a flat or otherwise lidlike surface). In a next step 803, centroids may be determined for each tank lid, to provide a representation of a tank lid's location. In a next step 804, pixels of a tank displayed within the image may be isolated based on the lid's longitudinal axis, representing the tank's diameter, as well as right angles to the axis, representing the tank's height. In a next step 805, data ascertained thus far in previous steps may be used to compute further tank values that may be inferred from known data, such as a tank's height, radius, or lid height from tank's base. In a next step 806, tank lid height as previously computed may be used to determine a tank's shadow properties for further analysis. In a next step 807, a next tank may be located such as by a spiral search algorithm in the image space, to continue processing on multiple tanks within a given image area. In a next step 808, a tank's shadow shape may be predicted as in above step 806. In a next step 809, this predicted shadow may be compared to an extracted shadow computed from known data such as tank position, viewing angle, sun position, or other relevant information regarding either a particular tank or image space being viewed. In a next step 810, a closest match from shadow comparison in a previous step 809 may be selected as a new lid height measurement for a given tank and viewing condition (such as sun position, viewing angle, or other conditions). In a looping step 811, a next tank may be selected and processing continues according to step 807 within an image space, or in an alternate looping step 812 a next image may be selected and processing continues from an initial step 801 within a new image space. In a final step 813, tank volume and fill factor may be computed from resulting output data from previous processing steps for processed tanks and image.

FIG. 9 is an illustration of an exemplary user interface 900, for viewing and interacting with various components or data of a system 400. As illustrated, an image 910 may be viewed for user interaction, such as positioning of a cursor 411 as described previously (referring to FIG. 4), for analysis of a tank 412 being displayed. A plurality of clickable or otherwise interactive interface component 920 such as a button may be utilized, such as for loading a new image (as illustrated) or other interaction as may be desirable. It should be appreciated that a variety of interactions may be desirable and possible according to the invention, such as utilizing interface elements for positioning of cursor 411 rather than use of a pointing device as previously described (such as in hardware arrangements without a pointing device), or other uses.

In various embodiments, interface 900 may be provided with user interface tools adapted to facilitate semiautomatic or manual estimation of tank fill levels for a plurality of oil tanks 412. For example, a toolbar 920 may be provided to arrange a plurality of action buttons that may be used by a user; one having ordinary skill in the art of user interface design will readily recognize that various arrangements of toolbars 920, pull-down menus, context-sensitive menus, popup boxes, and the like may be used to facilitate user interaction, and that toolbar 920 is merely illustrative of a potential user interface approach. In the illustrated exemplary embodiment, a Previous button 921 and a Next button 922 allow a user to navigate between oil tanks 412 as desired. As noted above, such navigation may be facilitated by automated oil tank 412 detection, by manual tank 412 configuration, or by use of a stored database of tanks 412 and their locations (and geometries). For example, if cursor 411 is placed over tank 412, in some embodiments a popup box 930 may be provided to assist a user in using and/or editing an existing tank database. Box 930, as shown in an exemplary embodiment, may provide data 932 pertaining to an existing tank 412 in a tank database (which would typically be part of database 430), such as its geographic position (e.g., latitude and longitude) and its dimensions (e.g., height and diameter); additionally, a tank image 931 from database 430 may be displayed to aid in visual identification or verification that the tank 412 being viewed is the same as the one whose image 931 and data 932 were pulled from database 430. Identifying which tank 412 in database 430 should be displayed in box 930 may be done, for example, by determining a latitude and longitude of the position of cursor 411 and then looking in database 430 to identify the closest tank to that location, and displaying the corresponding image 931 and data 932 in box 930. In some embodiments, users may be provided with a means to edit (e.g., Edit button 933) a tank's data; this may be needed for example when image 931 does not correspond to tank 412, or when dimensional or other data 932 is either missing, incomplete, or inaccurate. When Edit button 933, an additional popup or other user interface means may be provided to facilitate editing, including for example manually determining tank 412 dimensions using cursor 411, selecting other nearby tanks from database 430 until the correct tank is made (and then optionally establishing an offset to use when searching for subsequent tanks, the offset corresponding to the difference between the location of cursor 411 and the location in database 430 of the correct tank whose image 931 is ultimately selected). Other editing means are of course envisioned by the inventor, such as adding tanks to database 430 (such as when a new tank farm is detected or added manually), changing identifying information or ancillary information about a tank, and so forth. When a user is finished editing a tank's 412 data 932, a Done button 934 may be used to formally update database 430 with the new data (or to submit the data for quality review before finally amending database 430), and thereby exiting and closing box 930. A Load Image button 923 may be provided to allow a user, once all the tanks in a current image 910 have been measured or analyzed (or as desired), to select a new image 910 to work with. An Export button 924 may be provided to export tank-loading data extracted from image 910 to database 430 and/or data output 480 (for use by other users or applications). Finally, a Manual button 925 (which may also be a toggle button to toggle between Manual and Auto, or to cycle between Manual, Auto, and Semi-Auto, modes), which allows a user to enter a purely manual mode in which the user manually selects each tank, optionally retrieves data from database 430 once a tank is selected (possibly using box 930), and then manually marks the tank's lid position to identify fluid loading in that tank 412. It will be appreciated that interface 900 is exemplary, and that many other interface arrangements are possible using user interface elements known in the art, in order to facilitate rapid estimation and recording of multiple tank loading values manually, semi-automatically, or automatically.

The skilled person will be aware of a range of possible modifications of the various embodiments described above. Accordingly, the present invention is defined by the claims and their equivalents.

What is claimed is:

1. A computerized system for determining volume of oil in oil storage tank using satellite image data, comprising:
   a computing device comprising at least a processor and a memory and further comprising an extraction software module comprising programmable code stored in the memory and operating in the processor and an analysis software module comprising programmable code stored in the memory and operating in the processor;
   wherein the extraction software module extracts information from satellite image data comprising a plurality of images of an oil storage tank viewed from orbit and received from a server via a network, wherein the extracted information comprises at least information pertaining to image acquisition parameters and a sun angle dependent on the image acquisition parameters;
   wherein the extracted information further comprises at least measurement information pertaining to a plurality of parameters pertaining to the oil storage tank, including at least a radius, height, and geolocation of the oil storage tank; and further wherein the analysis software module uses the extracted information to determine a volume of oil stored in the oil storage tank by measuring a shape of a sun shadow projected onto a lid of the oil storage tank and determining a height of the tank lid based on the sun shadow and the extracted information.

2. The system of claim 1, wherein the image data is stored in a database.

3. The system of claim 1, further comprising a video display device and a pointer device.

4. The system of claim 3, wherein the pointer device is used to position a cursor displayed on the video display device to designate a specific element of an image as the oil storage tank.

5. A method for determination of volume of oil in oil storage tank using satellite imagery, comprising the steps of:

loading, at a computing device comprising at least a processor, a memory, an extraction software module comprising programmable code stored in the memory and operating in the processor, and an analysis software module comprising programmable code stored in the memory and operating in the processor, a satellite image comprising at least an image of an oil storage tank viewed from orbit;

extracting information, using the extraction software module, from the satellite image, the extracted information comprising at least measurement information pertaining to a plurality of parameters pertaining to the oil storage tank including at least a radius, height, and geolocation of the oil storage tank, wherein the extracted information further comprises at least information pertaining to image acquisition parameters and a sun angle dependent on the image acquisition parameters;

determining, using the analysis software module, a volume of oil stored in the oil storage tank using the extracted information by measuring a shape of a sun shadow projected onto a lid of the oil storage tank and determining a height of the tank lid based on the sun shadow and the extracted information.

6. The method of claim 5, wherein the steps are performed iteratively over a plurality of oil storage tanks.

\* \* \* \* \*